April 2, 1946.　　　S. W. HODGDON　　　2,397,860
GRINDING MACHINE
Filed Dec. 15, 1943　　　2 Sheets-Sheet 1
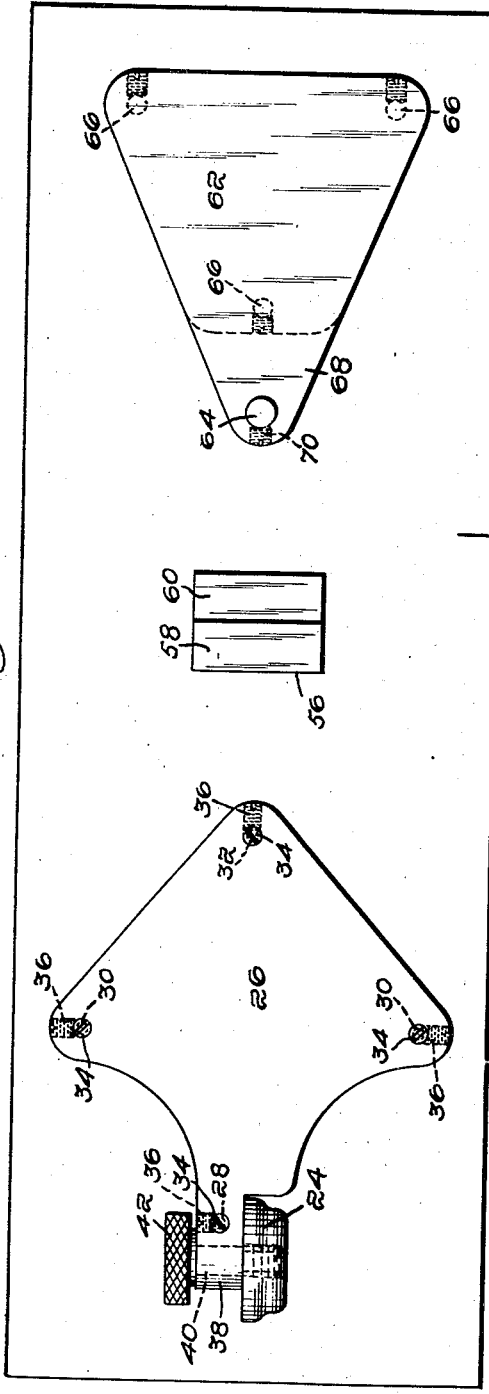
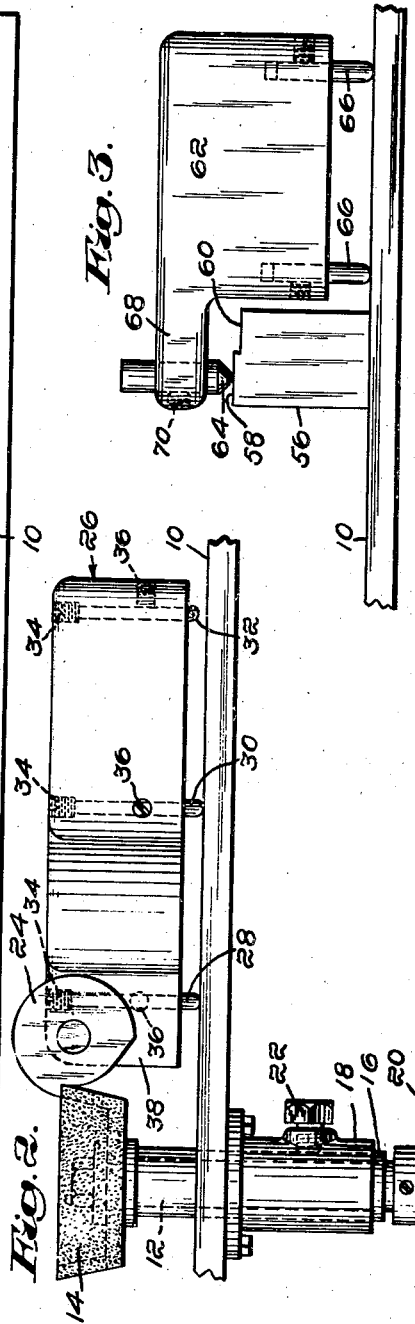
Inventor:
Stuart W. Hodgdon,
by Churchill & Jenney
Attorneys April 2, 1946. S. W. HODGDON 2,397,860
GRINDING MACHINE
Filed Dec. 15, 1943 2 Sheets-Sheet 2
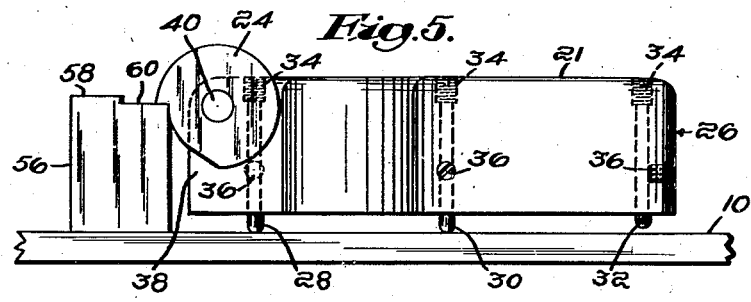
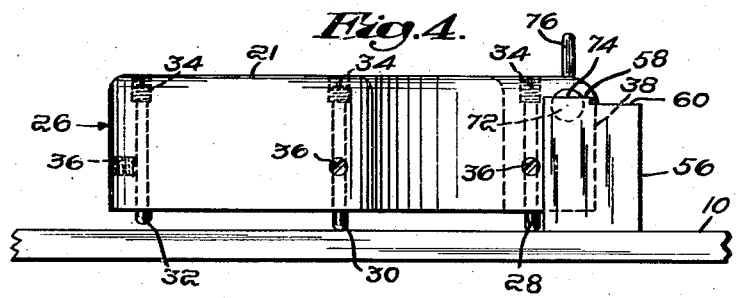
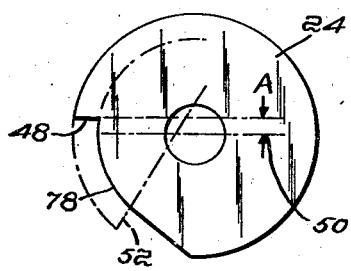
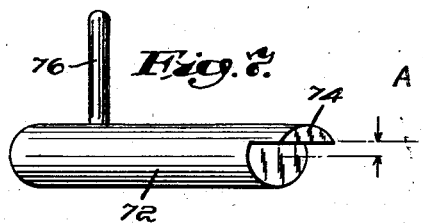
Inventor:
Stuart W. Hodgdon,
by Churchill & Jenney
Attorneys Patented Apr. 2, 1946

2,397,860

UNITED STATES PATENT OFFICE 2,397,860

GRINDING MACHINE

Stuart W. Hodgdon, Poland, Maine

Application December 15, 1943, Serial No. 514,332

4 Claims. (Cl. 51—221)

The present invention relates to grinding machines, and more particularly to a machine for sharpening circular formed cutters and the like.

Such cutters are frequently employed in automatic screw machines for operations involving the machining of a contour, since cutters of this type permit relatively complex contours to be formed accurately in a single cut. Circular formed cutters derive their designation from the fact that, prior to formation of a cutting face, the desired contour of the cutting edge is formed in the periphery of the tool as a surface of revolution. A portion of the periphery is then ground away to expose a cutting edge having a cutting face parallel to a diameter of the cutter and offset therefrom a small predetermined distance depending on the tool diameter. When the tool is clamped in the tool holder with its cutting edge at the same height as the tool and work centers, this offset provides the desired rake angle.

A special advantage in this type of tool resides in the fact that when the tool becomes dull with use, it may be resharpened by grinding the cutting face only, without altering the contour of the cutting edge. After sharpening, the cutter is replaced in the machine with the new cutting edge set at the correct height by a slight rotational adjustment of the cutter from its prior position. With repeated sharpenings, the cutting edge, in effect, proceeds around the periphery of the cutter without in any way modifying the contour of the tool in relation to the work. As a result, the tool may have an extensive life with no loss of accuracy.

It is evident that the full advantages of this type of tool may be realized only if the sharpening operation can be carried out accurately and rapidly. Such operation is, however, relatively difficult, since it is necessary to limit accurately the amount of material removed and to maintain with a high degree of precision the offset between the cutting face and the tool center. Unless special precautions are taken, it is frequently found that errors in sharpening tend to be cumulative, so that after several sharpenings a serious departure of the cutting face from the proper relationship is observed.

The correct offset of the cutting face can only be maintained if, each time the tool is sharpened, the position of tool center and cutting edge are accurately determined with reference to the abrasive wheel. To do this with ordinary measuring instruments such as micrometers, gauge blocks, and the like, is time-consuming, and, when attempted by unskilled operators, frequently leads to unsatisfactory results.

It is, therefore, the object of the present invention to provide a machine by which circular formed cutters may be sharpened accurately and rapidly without requiring a specially trained and skilled operator.

More specifically, it is an object of the invention to provide means by which a cutter may be presented to the abrasive wheel in accurate predetermined relation for removal of the minimum amount of material necessary to restore the tool to sharpened condition.

To this end, cutter holding means are provided having provision for accurate setting of the cutter relative to the wheel preliminary to the engagement of cutter and abrasive wheel for the sharpening operation itself. The preliminary setting operation involves separate and independent steps by which the center of the cutter and the position of the cutting edge to be sharpened may each be determined with high precision so that when the cutter is presented to the wheel not only is a predetermined amount of material removed, but also the newly exposed cutting face bears the correct offset relative to the tool center. Furthermore, the preliminary setting operations are so carried out that their accuracy is in no way dependent on the accuracy of the preceding sharpening, thus preventing errors of a cumulative nature.

These and other features and advantages will be apparent to those skilled in the art from the following description, taken in conjunction with the accompanying drawings, in which Fig. 1 is a plan view of certain components of the cutter grinding machine, showing the cutter holder, the gauge block, and the wheel truer; Fig. 2 is a view in elevation of a portion of the machine showing the sharpening of a cutter; Fig. 3 is a side view of the wheel truer showing the setting thereof relative to the gauge block; Figs. 4 and 5 are views showing the steps of setting the cutter holder and cutter prior to the sharpening operation; Fig. 6 is a view, on an enlarged scale and partly diagrammatic, of a circular formed cutter; and Fig. 7 is an oblique view of the cutter offset gauge.

The cutter grinding machine comprises a flat working surface or table 10 in which is mounted a vertical arbor 12 carrying an abrasive wheel 14. The wheel is preferably of tapered cup-shaped contour. The arbor rotates within a bearing 16 which is vertically slidable within mounting 18 to permit adjustment of the wheel height relative to the work surface 10. A pulley 20 on the lower end of the arbor permits a belt-drive connection to a motor, not illustrated. Clamp screw 22 provides a means for locking the bearing sleeve 16 in adjusted position.

In carrying out the sharpening of a circular formed cutter such as indicated at 24, the cutter is mounted in a holder 26 which rests on the work surface 10. The holder is supported on round nosed pins 28, 30 and 32, projecting downwardly from the tool holder to permit the holder to be moved along the work surface in accurate heightwise position determined by the setting of the pins. Adjusting screws 34 at the top of each pin enable this setting to be made with precision, while set screws 36 serve to lock the pins in adjusted position.

The cutter is secured to a projecting portion 38 of the holder adjacent supporting pin 28 by means of a mounting screw 40 threaded at one end to engage the threaded hole in the cutter. The screw extends through a passage or bore in the holder, the supporting pins 30 of the holder being so adjusted that the axis of the screw lies parallel to the work surface 10. The screw may be rotated by means of a knurled head 42 to clamp and unclamp the cutter.

In order to sharpen the cutter properly, it is necessary to correlate the three variables or adjustments that have already been indicated. These are (a) the height of the top surface of the abrasive wheel above the work surface 10 (b) the height of the cutter holder or, more specifically, the height of the center of the cutter, and (c) the angular position of the cutter relative to the plane of the work surface. These adjustments must each be made accurately in order that the cutting face 48 of the cutter after sharpening may be parallel to and offset from a line through the center of the cutter a definite distance. Thus, in Fig. 6, the cutting face 48 is parallel to a diameter as represented by dotted line 50 and spaced therefrom a distance A which for purposes of illustration, may be taken as 1/8". When the cutter is first sharpened the cutting face occurs at 52, but with repeated sharpening, the cutting face proceeds around the periphery of the cutter, while maintaining the initial offset and depth of cutting face.

To set the machine for sharpening such a cutter, the various adjustments are made with reference to a gauge block 56 which is preferably although not necessarily secured to the work surface 10 of the machine. The gauge block is provided with upper and lower gauging surfaces 58 and 60, respectively, representing primary and secondary dimensions having a difference equal to the amount of material to be removed from the cutter at each sharpening. The actual overall height of the block is not critical, but only the difference between the two gauge surfaces. Such difference is generally of the order of 0.005 inch, which corresponds in most cases to the minimum amount that must be removed for proper sharpening of the cutting edge.

The first step in the sharpening operation is to set the abrasive wheel at the height of the upper surface or primary dimension of the gauge block. This is accomplished by a wheel trueing unit 62 having a diamond-pointed dressing tool 64. This unit, illustrated in Figs. 1 and 3, may be of generally triangular shape in plan, having three round-nose adjustable supporting pins 66. The dressing tool 64 is adjustably secured in an overhanging portion 68 of the body of the trueing device, and is set so as to touch the top surface 58 of the gauge block. After tightening the clamp screw 70, the truer is moved into proximity to the abrasive wheel and the wheel height set so that when the truer is slid along the work surface to cause the tool point to pass across the top face of the wheel, a light dressing cut is taken. This establishes with a high degree of accuracy the cutting surface of the abrasive wheel at the same height as the upper surface of the gauge block.

The next step is to set the cutter holder so that the center of the cutter lies below the top of the abrasive wheel an amount exactly equal to the offset which is to be maintained between the cutting face of the cutter and a diameter parallel thereto. This is accomplished, independently of the angular position of the cutter and in fact prior to mounting the cutter on the holder, by means of the cutter offset gauge shown in Fig. 7. The gauge consists of a rod 72 of the same diameter as the cutter mounting screw 40 so as to fit accurately within the transverse bore in the cutter holder. The gauge is cut away at one end to leave a "flat" 74 that is spaced from the center of the rod a distance A equal to the offset of the cutter to be sharpened. Since a relatively small number of different offsets covers the range of cutter sizes generally encountered, gauges having offsets corresponding to the standard offsets may easily be provided.

In setting the cutter holder, the rod 72 is slipped into the holder in place of the clamp screw 40 and the holder moved into position on the work table so that the flat 74 is over the top face 58 of the gauge block. Assuming that the forward pin 28 is sufficiently extended so that the flat 74 is not in contact with the block, the adjusting screw 34 at the top of pin 28 may be slowly rotated to lower the forward end of the holder. At the same time, the operator may rock the rod 72 by means of handle 76 so as to check the clearance between the flat 74 and the top of the gauge block. Proper adjustment of pin 28 is attained just at the point where the slack or rock ceases. The set screw 36 is then tightened to lock the pin 28.

After thus establishing with precision the offset of the cutter axis relative to the upper surface of the gauge block and hence relative to the operating face of the abrasive wheel, the offset gauge 72 is removed and the cutter mounting screw 40 inserted in the holder, with the cutter mounted loosely thereon preliminary to adjustment of the position of the cutting face of the cutter. For this operation the holder, tipped forward to maintain the front pin 28 in contact with surface 10, is slid into a position where the cutting face of the cutter lies on the lower surface 60 of the gauge block, i. e., the surface lying 0.005 inch below the surface used in setting the wheel truer and the cutter holder. This operation is illustrated in Fig. 5, the difference in height between the two gauge block surfaces being exaggerated for the sake of clarity. With the cutter so positioned, the screw 40 is rotated to clamp the cutter firmly to the holder.

The actual sharpening operation is performed by sliding the holder, while resting on pins 28 and 30, along the work surface toward the abrasive wheel so that the wheel progresses across the cutting face of the cutter as far as the line 78 representing the depth of the cutting face. The use of a slightly tapered wheel aids in cutting to the proper depth, since the angle between the cutting face 48 and the adjacent body of the cutter is slightly less than 90 degrees.

Instead of advancing the holder in such manner that the shapening cut takes place progressively across the cutting face of the cutter, the holder may be advanced to the abrasive wheel while resting on central pins 30 and the rearmost pin 32, so that the cutting face to be sharpened comes into a position above but out of contact with the operating face of the wheel. The holder may then be tipped forward slowly to carry out the sharpening operation, the pin 28 in such case serving as a stop to limit the amount of material removed to that determined by the difference between the two surfaces of the gauge block.

In case a deeper cut must be taken, as where the cutter has been nicked, for example, it may be necessary to repeat the sharpening operation one or more times, removing at each operation an amount equal to the difference in height of the two surfaces of the gauge block. Alternatively, the gauge block may be formed with an additional surface spaced from the principal reference surface a somewhat greater distance than the one ordinarily employed for establishing the height of the cutting face of the cutter.

It will be understood that the complete sequence of steps above described need not be followed in every instance. Thus, where cutters having the same offset are being sharpened, it is not necessary to perform the step of setting the holder height by means of the offset gauge and the gauge block. Neither is it necessary to check the height of the abrasive wheel or to true the surface thereof at each sharpening. Thus in many instances the only adjusting operation to be performed is to clamp the cutter to the holder while the cutting face of the cutter rests on the lower surface of the gauge block. After this single preliminary step the holder may be advanced to present the cutter to the wheel, with the result that the whole sharpening operation may be performed in a matter of seconds. It is of course desirable that the various other adjustments be checked from time to time, using the cutter offset gauge, in order that readjustment may be made in case the ends of the supporting pins have become worn, for example.

Using the above described method and apparatus, it is evident that the sharpening of a circular formed cutter may be carried out with great accuracy, not only in respect to maintenance of the offset cutting face but also in respect to the amount of material removed by the sharpening. Furthermore, the various settings and adjustments may be carried out rapidly and by relatively unskilled operators, since it is not necessary to read micrometer scales, assemble gauge blocks, or adjust complex jigs.

I claim as my invention:

1. A machine for sharpening circular formed cutters comprising a work table, an abrasive wheel, a gauge block, a wheel trueing device settable to the gauge block for establishing a trued operating face of the wheel spaced from the work table a distance equal to the gauge block dimension, a cutter holder slidable over the work table, said holder having a cutter mounting screw for securing a cutter to the holder, a cutter offset gauge for said holder having its axis coaxial with the axis of the cutter mounting screw and having a surface offset from the axis of the screw a distance equal to the cutter offset for establishing by reference to the gauge block the offset of cutter axis relative to the trued operating face of the wheel, said gauge block having a supplementary gauge block dimension differing from the first dimension by the amount of material to be removed from the cutter by the sharpening operation for setting the unsharpened face of the cutter.

2. A machine for sharpening circular formed cutters comprising a work table, an abrasive wheel, a gauge block having a primary gauging surface spaced from the work table, means for establishing the operating face of the wheel at the height of the primary gauging surface of the gauge block, a cutter holder slidable over the work table, a cutter mounting screw for securing a cutter to the holder, means including a cutter offset gauge for said holder having its axis coaxial with the axis of the cutter and having a shoulder offset from said axis an amount equal to the cutter offset for adjusting by reference of the shoulder to the primary gauging surface of the gauge block the offset of cutter axis relative to the trued face of the wheel, and a supplementary gauging surface on the gauge block differing from the primary gauging surface in height from the work table by the amount of material to be removed from the cutter by a sharpening operation for setting the unsharpened face of the cutter.

3. A machine for sharpening circular formed cutters comprising an abrasive wheel, means for establishing a trued operating face of the wheel in predetermined spaced relation to a fixed reference surface, said means including a gauge block on said surface having a primary gauging dimension therefrom, a cutter holder having means for securing a cutter to the holder with the cutter axis in parallel, spatially adjustable relation to the reference surface, said holder being slidable along the reference surface to present the cutter to the wheel, cutter offset gauging means having its axis coaxial with the axis of the cutter on the holder and having a shoulder offset from said axis a distance equal to the cutter offset for setting by reference of the shoulder to the gauge block the cutter axis offset from the trued wheel face, said gauge block having a secondary gauging dimension differing from the primary dimension by the amount of material to be removed from the cutter by a sharpening operation for setting the unsharpened face of the cutter.

4. A machine for sharpening circular formed cutters comprising an abrasive wheel, means including a gauge block for establishing a trued operating face of the wheel at a predetermined height above a reference surface, a cutter holder having a cutter mounting screw for securing a cutter to the holder with the cutter axis in parallel, spatially adjustable relation to the reference surface, and a cutter offset gauge insertable in said holder coaxially with the axis of the mounting screw, the gauge having a shoulder offset from said axis a distance equal to the cutter offset for establishing by reference to the gauge block the height of the cutter axis above the reference surface to provide the offset of cutter axis relative to the trued wheel face.

STUART W. HODGDON.